UNITED STATES PATENT OFFICE.

FRIEDRICH RÜNKEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AZO DYE.

1,028,493.     Specification of Letters Patent.     Patented June 4, 1912.

No Drawing.     Application filed September 19, 1911. Serial No. 650,090.

*To all whom it may concern:*

Be it known that I, FRIEDRICH RÜNKEL, doctor of philosophy, chemist, citizen of the German Empire, residing at Elberfeld, Germany, have invented new and useful Improvements in New Azo Dye, of which the following is a specification.

This invention relates to the manufacture and production of new azo dyes of the formula:

(X=H or $SO_3H$) which are very suitable for the production of color lakes, pigment colors, which are prepared by the processes known in the arts from the azo dyestuffs.

The new dyes are obtained by combining the diazo compound of para-aminabenzophenone either with 2-naphthol-6-mono-sulfonic acid or with 2-naphthol-3.6-disulfonic acid. My new dyes are after being dried and pulverized powders yielding upon reduction with stannous chlorid and hydrochloric acid para-amino-benzophenone and a 1-amino-2-naphthol sulfonic acid.

The lake prepared from the dye containing the 2-naphthol-6-monosulfonic acid is of a brilliant orange while the other lake is of a bluish-red shade; both lakes are distinguished by their fastness to light and water.

In order to illustrate the new process more fully the following example is given, the parts being by weight:—5 parts of para-aminobenzophenone are dissolved in 40 parts of hot diluted hydrochloric acid and the solution is added to a mixture of 150 parts of water, 150 parts of ice, 1.8 parts of sodium nitrite and 10 parts of concentrated hydrochloric acid. The resulting diazo solution is then added to a solution of 9 parts of the sodium salt of 2-naphthol-3.6-disulfonic acid containing an excess of sodium carbonate. The mixture is heated, the dye is salted out, filtered off and dried. It is a red powder yielding upon reduction with stannous chlorid and hydrochloric acid para-aminobenzophenone and 1-amino-2-naphthol-3.6-disulfonic acid. Mix intimately 100 parts of finely ground heavy spar with a solution of 20 parts of aluminum sulfate in 1200 parts of hot water and add thereto a boiling solution of 6 parts of the azo dye obtained from diazotized para-aminobenzophenone and 2-naphthol-3.6-disulfonic acid in 1000 parts of water containing 10 parts of anhydrous sodium carbonate, boil the mixture and add to it while it is being stirred a hot solution of 30 parts of crystallized $BaCl_2$ in 300 parts of water. Boil, filter off and wash. The color of this lake is bluish-red while the color of the lake prepared in a like way from the dye obtained from diazotized para-aminobenzophenone and 2-naphthol-6-sulfonic acid is orange. The lakes and the coloring matters can also be produced in one operation.

I claim:—

1. The herein described new azo dyes being benzophenone-azo-naphthol-sulfonic acids, which are after being dried and pulverized powders yielding upon reduction with stannous chlorid and hydrochloric acid para-aminobenzophenone and a 1-amino-2-naphthol sulfonic acid, and being especially adapted for preparing pigments fast to light and water, substantially as described.

2. The herein described new azo dye being benzophenone-azo-2-naphthol-3.6-disulfonic acid, which is after being dried and pulverized a red powder yielding upon reduction with stannous chlorid and hydrochloric acid para-aminobenzophenone and 1-amino-2-naphthol-3.6-disulfonic acid and being especially adapted for preparing pigments fast to water and to light, substantially as described.

In testimony whereof I have hereunto set my hand in the presence of two subscribing witnesses.

FRIEDRICH RÜNKEL. [L. S.]

Witnesses:
   L. NEEFER,
   A. NEEFER.

It is hereby certified that in Letters Patent No. 1,028,493, granted June 4, 1912, upon the application of Friedrich Runkel, of Elberfeld, Germany, for an improvement in "Azo Dye," errors appear requiring correction as follows: In the grant and in the printed specification the name of the patentee was erroneously written and printed as "Friedrich Rünkel," whereas said name should have been written and printed *Friedrich Runkel;* line 19 of the printed specification for the compound word "para-aminabenzophenone" read *para-aminobenzophenone;* and that the said Letters Patent should be read with these corrections therein that the same may conform to the record of the case in the Patent Office.

Signed and sealed this 13th day of August, A. D., 1912.

[SEAL.]

E. B. MOORE,

*Commissioner of Patents.*